United States Patent [19]

Imre et al.

[11] 3,923,903

[45] Dec. 2, 1975

[54] OXIDATION OF CYCLIC MONO-OLEFINS TO α,ω-DIALDEYDES

[75] Inventors: Laszlo Imre, Cologne; Alfons Klein, Dusseldorf; Karlfried Wedemeyer, Cologne, all of Germany

[73] Assignee: Bayer Aktiengesellschaft, Leverkusen, Germany

[22] Filed: Nov. 28, 1973

[21] Appl. No.: 419,852

[30] Foreign Application Priority Data

Dec. 16, 1972 Germany............................ 2261657
June 9, 1973 Germany............................ 2329586

[52] U.S. Cl. ............................. 260/598; 260/604 R
[51] Int. Cl.² ........................................ C07C 45/02
[58] Field of Search ..................... 260/604 R, 598 R

[56] References Cited
FOREIGN PATENTS OR APPLICATIONS 778,125  7/1957  United Kingdom............. 260/604 R
718,603  11/1954  United Kingdom............. 260/604 R

OTHER PUBLICATIONS

Berkowitz et al., JACS, Vol. 80, pp. 6682–6684, 1958.

Schildknecht et al., Chem. Abstracts, Vol. 58, 12409, 1963.

*Primary Examiner*—James O. Thomas, Jr.
*Assistant Examiner*—R. H. Liles
*Attorney, Agent, or Firm*—Burgess, Dinklage & Sprung

[57] ABSTRACT

A process for the production of an α-ω-dialdehyde, comprising reacting a cyclic mono-olefin in the gaseous phase with oxygen at an elevated temperature. Preferably cyclopentene or cyclohexene respectively give glutardialdehyde and adipic dialdehyde by passage through a tubular reactor with air at 0.05 to 100 atmospheres and 200° to 500°C.

9 Claims, No Drawings

OXIDATION OF CYCLIC MONO-OLEFINS TO α-ω-DIALDEHYDES

This invention relates to a process for the production of α-ω-dialdehydes by oxidizing cyclic mono-olefins with oxygen or gases containing oxygen.

A few oxidation processes for the production of α-ω-dialdehydes are already known. Thus, the literature (Houben-Weyl: Methoden der Organischen Chemie, Stuttgart 1952, Vol. VII/1, pages 353-354) describes processes in which cyclo-1,2,-pentane diol or cyclo-1,2-hexane diol are oxidized with the calculated quantity of lead tetracetate in benzene solution or in glacial acetic acid to form glutardialdehyde or adipic dialdehyde, respectively. A similar process starts with cyclo-1,2-pentane diol, sodium bismuthate being used as the oxidizing agent and a mixture of glacial acetic and phosphoric acid as the solvent (Houben-Weyl: Methoden der Organischen Chemie, Stuttgart 1952, Vol. VII/1, page 356). Both these precesses are extremely complicated and have never acquired any commerical significance because expensive oxidizing agents are used and large quantities of solvents are required for largescale working. In addition, corrosion problems occur in cases where these oxidizing agents are used.

Another conventional process for the production of glutardialdehyde or adipic dialdehyde is the so-called ozone splitting of cyclopentene or cyclohexene 3,565,804, der Organischen Chemie, Stuttgart 1952, Vol. VII/1, page 339). Although this process has often been used for solving chemical problems in the laboratory, it has likewise never acquired any commercial significance because ozone is very expensive to manufacture and handle and because considerable risks are involved in handling the highly explosive ozonides obtained as intermediate products. Furthermore, glutaric acid semialdehyde is formed as a secondary product in the ozone splitting of cyclopentene.

It is accordingly an object of the invention to provide a simple efficient process for the production of alkane dials.

This object is realized in accordance with the present invention pursuant to which a cyclic mono-olefin is reacted in the gaseous phase with oxygen at an elevated temperature, thereby forming the desired α-ω-dialdehyde.

The reaction temperature can be varied within wide limits. In general, the reaction is carried out at temperatures of from about 200° to 500°C and preferably at temperatures of from about 250° to 450°C. The process according to the invention can be carried out under normal pressure, reduced pressure or elevated pressure. Suitable pressures are, for example, pressures in the range of about 0.05 to 100atms. The process is preferably carried out under pressure of about atmospheric pressure to 15 atms. and with particular preference at pressures of about atmospheric pressure to 3 atms.

The cyclic mono-olefins which can be used as starting substances in the process according to the invention are known. They generally contain about five to 12 carbon atoms. It is preferred to use cyclic mono-olefins with about five to eight C-atoms.

The following cyclic mono-olefins, for example, can be used as starting products: cyclopentane, cyclohexene, cycloheptene, cyclooctene, cyclononene, cyclodecene, cycloundecene and cyclododecene. The cyclic mono-olefins can be used in pure form or in admixture with other hydrocarbons. For example, the cyclic mono-olefins used can contain cycloalkanes. Where cyclopentene is used as the cyclic mono-olefin, it can be employed, for example; in admixture with cyclopentane and/or 2,2-dimethyl butane and/or n-hexane and/or 2-methyl-pentane.

The α-ω-dialdehydes obtainable by the process according to the invention contain the same number of carbon atoms as the particular cyclic mono-olefin used. It is possible, by the process according to the invention, to produce α-ω-dialdehydes which generally contain about five to 12 carbon atoms. For example, alkane dials such as glutardialdehyde, adipic dialdehyde, heptane dial, octane dial, nonane dial, decane dial, undecane dial and dodecane dial can be produced by the process according to the invention.

The process according to the invention can also be carried out by reacting a mixture comprising two or more different cyclic mono-olefins and optionally comprising further hydrocarbons, resulting in the formation of a mixture of two or more α-ω-dialdehydes.

The quantity of oxygen or gases containing oxygen used in the process according to the invention for the production of α-ω-dialdehydes can be varied within wide limits. For example, it is possible to use about 0.005 to 200 mols of oxygen, expressed as pure oxygen, per mole of cyclic mono-olefin. Allowance must, of course, be made for the explosion limits within this range.

It is preferred to use about 0.02 to 50 moles of oxygen per mole of cyclic mono-olefin, and particularly preferred to use about 0.05 to 5 moles of oxygen per mole of cyclic mono-olefin. The oxygen can, of course, be used in admixture with inert gases. As used herein, the term "inert gas" is defined as a gas which does not react with a cyclic mono-olefin. It is advisable to add an inert gas, for example, when cyclic mono-olefin/oxygen mixtures which lie close to or within the explosion limits are used within the aforementioned ranges. It can also be advisable to add an inert gas in cases where it is intended to increase the rate of flow or more effectively to dissipate the heat of reaction liberated. For example, it is possible to use oxygen/nitrogen or oxygen/carbon dioxide mixtures containing up to 98 % by volume, preferably up to 80 % by volume, of the inert gas. In cases where it is intended to use oxygen diluted with inert gases, the use of air is particularly preferred. The process according to the invention can also be carried out in the presence of other inert compounds, for example inert gases such as nitrogen, carbon monoxide, carbon dioxide or water vapor.

The rate of flow can be varied within wide limits. For example, the rate of flow may be regulated in such a way that residence times in the reaction zone of about 0.01 to 100 seconds, preferably about 1 to 30 seconds, are obtained.

If the cyclic mono-olefin is only partly reacted after passing straight through the reaction zone, the α-ω-dialdehyde obtained can be separated off by conventional procedures, for example partial or complete condensation, optionally followed by distillation, or by washing, and the residual gas can be returned to the reaction. If the α-ω-dialdehyde obtained is separated off by condensation, unreacted mono-olefin can be condensed together with the α-ω-dialdehyde formed, especially in the production of α-ω-dialdehydes containing six and more carbon atoms. The unreacted mono-olefin can be separated off from condensates of this kind by distillation and similarly returned to the reaction. In order to obtain a high degree of selectivity, it may be advisable to react only part of the cyclic mono-olefin in a straight pass through the reaction zone.

The starting products can be delivered to the reactor and heated in various ways. The cyclic mono-olefin can be evaporated in an evaporator and mixed in gaseous form with oxygen or oxygen/inert gas mixture, for example air. For example, a high-turbulence compression chamber or a mixing nozzle can be used for this purpose. The starting mixture thus obtained can be passed first into a preheater and then into the reactor where it is optionally further heated to the reaction temperature. The cyclic mono-olefin and the oxygen or oxygen-containing gas mixture can also be separately heated. For example, the reactants can be separately introduced into the reactor. If the reaction is carried out in the presence of inert gases or vapors, it is also possible to add water vapor, for example as the inert gas. In this case, it is possible, for example, to heat the water vapor to the required temperature, to introduce oxygen, optionally in admixture with an inert gas or in the form of air, subsequently to add the cyclic mono-olefin and to pass this mixture through the reactor.

The reactor can, for example, be in the form of a tube reactor. The reaction tubes can be surrounded by a heat-transfer medium, for example a salt melt, for temperature distribution.

The reaction mixture leaving the reactor is generally delivered to a working-up stage. For example, the reaction mixture can be condensed or subjected to a wash. The wash is best carried out with water, advantageously in a multistage washer. An aqueous solution containing the α-ω-dialdehyde formed is obtained in this way.

However, the mixture leaving the reactor can also be worked up by indirect cooling, optionally by fractional cooling. In this way, the resulting α-ω-dialdehyde can be separated in polymeric form in suitable separation vessels. Monomeric α-ω-dialdehyde can be obtained from this polymeric form in a conventional manner, for example by vacuum distillation or by heating. Separation in the polymeric form is just as suitable as washing with water for isolating the α-ω-dialdehydes. By washing with water it is possible to obtain aqueous solutions of α-ω-dialdehydes which, in many cases, are ready as such for further use on a large scale and represent a standard commercial form of the α-ω-dialdehydes.

The residual gas remaining after separation of the α-ω-dialdehyde formed can be returned to the reaction along with make-up cyclic mono-olefin and oxygen. A continuous circuit is obtained in this way.

In cases where a cyclic mono-olefin containing one or more further hydrocarbons is used, these hydrocarbons accumulate in the circuit. An excessive increase in the hydrocarbon content of the recycled gas can be prevented by tapping a side stream from the main circuit.

In cases where oxygen/inert gas mixtures are used and especially in cases where oxygen is used in the form of air, it may be necessary, in the event of partial reaction, to separate the unreacted cyclic mono-olefin from the inert gases, from the nitrogen in particular. This separation can be effected by pressure distillation or even by washing, for example with Diesel oil, followed by heating of the unreacted cyclic mono-olefin.

It is particularly economical to blow the cyclic mono-olefin out of the Diesel oil with the air required for the fresh reaction at an elevated temperature. Depending upon the concentration ratios, it may also be sufficient to deliver only a component stream of the recycled gas to this working-up stage.

One preferred embodiment of the process according to the invention is carried out as follows:

The cyclic mono-olefin is evaporated in an evaporator and mixed in gaseous form with oxygen or an oxygen/inert gas mixture, for example air. The resulting starting mixture is first heated to around 180° to 200°C in a preheater and then passed into the reactor in which it is further heated to a reaction temperature in the range of from 300° to 450°C. This reaction is carried out under a pressure of from 1 to 3 atms. The α-ω-dialdehyde formed is isolated from the reaction product by washing with water, an aqueous solution of the α-ω-dialdehyde being obtained.

The process according to the invention is distinguished from conventional processes by the fact that α-ω-dialdehydes can readily be produced continuously in large quantities. Inexpensive and readily available starting materials are used. The use of solvents is avoided by working in the gaseous phase. The presence of a catalyst is unnecessary. Hardly any corrosion problems occur.

For example it is possible by the process according to the invention to produce glutardialdehyde which can be used as a tanning agent (J. Am. Leather-Chemists Assoc. 54, pages 668 to 679, (1959).

The process according to the invention is illustrated in the following Examples.

EXAMPLE 1

8.55 g/h of cyclopentene were introduced at 80°C into an evaporation vessel with a volume of approximately 100 cc, and mixed under a total pressure of 1 atm. with 7.55 l of nitrogen and 0.58 l of oxygen. This corresponds to an initial composition of 27 % by volume of cyclopentene, 5.2 % by volume of oxygen and 67.8 % by volume of nitrogen. The resulting gas mixture was heated to 180°C in a preheater and passed into an electrically heated reaction tube 40 cm long and 1.8 cm in diameter. The reaction tube had a homogeneous temperature zone approximately 8 cm long which is kept at 340°C. The oxidation reaction took place in this zone. The throughput rate amounted to 3.1 cc/second, the flow rate to 1.22 cm/second and the reaction time to 6.6 seconds. The gas mixture leaving the reactor was investigated by gas chromotography, infra-red, nuclear-magnetic-resonance and mass spectroscopy and the formation of glutardialdehyde was established. Under the conditions specified, a conversion of 20.3 %, based on the oxygen used, was obtained. The conversion was determined by gas chromatography using a M-13X-column (molecular sieve 13X). In order quantitatively to determine the reaction product, the gas stream was washed with water and the resulting aqueous solution was analyzed by gas chromatography using a Porapak P- or an FFAP-column. An FFAP-column contains 10 % of Carbowax 20 M and nitroterephthalic acid on Chromosorb W DMCS-60/80 mesh. Under the reaction conditions specified, 1.57 g of glutardialdehyde was obtained over a period of 6 hours. This corresponded to a selectivity of 53 %, based on oxygen, and to a selectivity of 58.2 %, based on cyclopentene.

EXAMPLE 2

The procedure was as in Example 1, except that the glutardialdehyde formed was isolated from the gas stream in polymeric form at room temperature in a separation vessel. 91 % of the glutardialdehyde formed was separated in this way. The monomeric form was obtained from it by vacuum distillation.

EXAMPLE 3

The procedure was as in Example 1, except that oxidation was carried out at different temperatures. The results are set out in Table 1:

Table 1

| Temperature °C | Conversion [%] based on O₂ | Selectivity [%] based on O₂ | based on  |
| --- | --- | --- | --- |
| 320 | 5.7 | 61.2 | 64.5 |
| 330 | 14.7 | 58.8 | 62.3 |
| 340 | 20.3 | 53.0 | 58.2 |
| 362 | 28.8 | 46.3 | 51.0 |
| 378 | 36.6 | 31.6 | 38.2 |
| 410 | 43.6 | 26.4 | 36.7 |

EXAMPLE 4

The procedure was as in Example 1, except that different mixing ratios were used. The results are set out in Table 2:

Table 2

| O₂ |  | N₂ | Conversion [%] based on O₂ | Selectivity [%] based on O₂ | based on  |
| --- | --- | --- | --- | --- | --- |
| [% by volume] | | | | | |
| 1.96 | 27 | 71.04 | 8.4 | 69.0 | 70.6 |
| 3.2 | 27 | 69.8 | 16.7 | 57.4 | 64.6 |
| 4.7 | 27 | 68.3 | 23.5 | 52.8 | 55.2 |
| 5.2 | 27 | 67.8 | 20.3 | 53.0 | 58.2 |
| 10.0 | 27 | 63.0 | 39 | 56.0 | — |

EXAMPLE 5

The procedure was as in Example 1, except that different residence times (τ) were employed. The results are shown in Table 3:

Table 3

| τ (sec) | Conversion [%] based on O₂ | Selectivity [%] based on O₂ | based on  |
| --- | --- | --- | --- |
| . | 6.7 | 68.6 | 72.2 |
| 4.7 | 14.0 | 65.0 | — |
| 6.6 | 20.3 | 53.0 | 58.2 |
| 16 | 56. | 41.0 | 44.1 |

EXAMPLE 6

The procedure was as in Example 1, except that nitrogen and carbon monoxide or water was added to the oxygen/cycopentene gas mixture. The carbon monoxide was not oxidized under the reaction condition. The particular gas composition and the conversions and selectivities obtained are shown in the following Table:

Table 4

| O₂ |  | N₂ | H₂O | CO | Temperature °C | Conversion [%] based on O₂ | Selectivity [%] based on O₂ |
| --- | --- | --- | --- | --- | --- | --- | --- |
| | [% by volume] | | | | | | |
| 5.2 | 27 | 65.4 | 2.4 | — | 340 | 9.4 | 60.2 |
| 5.2 | 27 | 64.2 | 3.6 | — | 362 | 13.6 | 58.3 |
| 5.2 | 27 | 55.8 | 12.0 | — | 378 | 15.5 | 54.4 |
| 5.2 | 27 | 65.2 | — | 2.6 | 340 | 19.8 | 52.6 |
| 5.2 | 27 | 64.3 | — | 3.5 | 340 | 18.2 | 55.4 |
| 5.2 | 27 | 62.4 | — | 5.4 | 362 | 27.8 | 48.9 |

EXAMPLE 7

The procedure was as in Example 1, except that a gas mixture additionally containing cyclopentane was reacted. The gas mixture had the following composition:

5 2 % by volume of oxygen, 27 % by volume of cyclopentene, 53.8 % by volume of nitrogen and 14 % by volume of cyclopentane. 1.76 g of glutardialdehyde were obtained over a period of 6 hours.

EXAMPLE 8

36 l/h of a gas mixture of the following composition: 25 % by volume of cyclopentene, 50 % by volume of oxygen and 25 % by volume of nitrogen, were reacted at 360°C using the apparatus described in Example 1. 3.4 g of glutardialdehyde were obtained in polymeric form by condensation over a period of 4 hours.

EXAMPLE 9

The procedure was as in Example 8, except that a gas mixture consisting of 25 % by volume of cyclopentene and 75 % by volume of oxygen was reacted. 4.1 g of glutardialdehyde were obtained by condensation over a period of 4 hours.

EXAMPLE 10

A gas mixture consisting of 25 % by volume of cyclopentene, 70 % by volume of nitrogen and 5 % by volume of oxygen was reacted at 330°C and 10 atms. in a pressure tube 32 cm long and 1.8 cm in diameter. 7.3 g of glutardialdehyde in polymeric form were obtained by condensation over a period of 6 hours.

EXAMPLE 11

The procedure was as in Example 1, except that 2.75 l/h of cyclohexene, 0.54 l/h of oxygen and 7.71 l/h of nitrogen were introduced into the reaction tube at 320°C after passing through the mixing chamber and the preheater. This corresponds to an initial gas composition of 25 % by volume of cyclohexene, 4.9 % by volume of oxygen and 70.1 % by volume of nitrogen. The residence time in the reaction zone amounted to 6.7 seconds. A conversion of 87.8 %, based on the oxygen used, as determined by gas chromotography using an M-13X-column, was obtained under these reaction conditions. The formation of adipic dialdehyde was established by gas chromatography, infra-red, nuclear-magnetic-resonance and mass spectroscopy. In order quantitatively to determine the adipic dialdehyde, the gas stream was washed with water and the resulting aqueous solution was analyzed by gas chromatography using an NSP XE 60 (Cromosorb W, HP-80/100 mesh) or a Silicon OV 225 (Cromosorb W HP-80/100 mesh) column. Under the reaction conditions specified, 3.98 g of adipic dialdehyde were obtained over a period of 8 hours. This corresponds to a selectivity of 22.2 %, based on oxygen, and to a selectivity of 44.5 %, based on cyclohexene.

EXAMPLE 12

The procedure was as in Example 11, except that the adipic dialdehyde formed was isolated together with the unreacted cyclohexene at room temperature in a separation vessel. In this way, 57 % of the adipic dialdehyde formed was obtained in monomeric form in solution in cyclohexene, and 43 % in polymeric form. The cyclohexene was separated from the solution of monomeric adipic dialdehyde in cyclohexene by distillation. The monomeric form was obtained from the polymeric form of the adipic dialdehyde by vacuum distillation.

EXAMPLE 13

The procedure was as in Example 11, except that the reaction temperature was varied. The results are set out in Table 5:

Table 5

| Temperature °C | Conversion (%) based on O$_2$ | Selectivity (%) based on O$_2$ | Selectivity (%) based on  |
|---|---|---|---|
| 320 | 87.8 | 22.2 | 44.5 |
| 302 | 30.6 | 31.3 | 45.7 |
| 290 | 24.5 | 35.6 | 49.0 |
| 276 | 11.4 | 38.3 | 53.2 |

EXAMPLE 14

The procedure was as in Example 13, except that a gas mixture of the following composition was reacted: 5.5 % by volume of oxygen, 14.5 % by volume of cyclohexene, 75 % by volume of nitrogen and 5 % by volume of cycohexane. The results are set out in Table 6:

Table 6

| Temperature °C | Conversion (%) based on O$_2$ | Selectivity (%) based on O$_2$ | Selectivity (%) based on  |
|---|---|---|---|
| 372 | 38.2 | 13.8 | 26.8 |
| 348 | 31.0 | 24.0 | 35.4 |
| 322 | 16.3 | 39.5 | 47.0 |

EXAMPLE 15

11 l/h of a gas mixture consisting of 18.2 % by volume of oxygen, 13 % by volume of cyclohexene and 68.8 % by volume of nitrogen were reacted at 310°C using the apparatus described in Example 1. A conversion of 46.5 % based on the cyclohexane used, was obtained. 24.9 % of the cyclohexene reacted was oxidized into adipic dialdehyde.

EXAMPLE 16

The procedure was as in Example 11, except that nitrogen and carbon monoxide or water was added to the oxygen/cyclohexene mixture at 300°C, the reaction time amounting to 4.1 seconds. The results are set out in Table 7:

Table 7

| O$_2$ |  | N$_2$ | H$_2$O | CO | Conversion (%) based on O$_2$ | Selectivity (%) based on  |
|---|---|---|---|---|---|---|
| (% by volume) | | | | | | |
| 4.9 | 25 | 39.1 | 31 | — | 23.5 | 51.5 |
| 4.9 | 25 | 64.2 | — | 5.9 | 27.6 | 43.2 |

EXAMPLE 17

11 l/h of a gas mixture consisting of 5 % by volume of oxygen, 20 % by volume of cyclooctene and 75 % by volume of nitrogen were reacted at 325°C by the procedure described in Example 1. 3.56 g of octane dial were formed over a period of 6 hours, being isolated together with unreacted cyclooctene by condensation at room temperature. In this way, 69.6 % of octane dial formed were obtained in monomeric form in solution in cyclooctene, and 30.4 % in polymeric form. The monomeric form was obtained from the polymeric from by vacuum distillation. The conversion amounted to 76 %, based on the oxygen used. The corresponds to a selectivity of 24.1 %, based on oxygen. The condensed cyclooctene was separated in the same way as described for cyclohexene in Example 12.

EXAMPLE 18

10.1 l/h of a gas mixture consisting of 5.6 % by volume of oxygen, 11.1 % by volume of cyclooctene and 83.3 % by volume of nitrogen were introduced into the reaction tube at 308°C in the same way as in Example 17. The octane dial formed was washed out of the gas stream with water and was quantitatively determined. A conversion of 24 %, based on the cyclooctene used, was obtained under these reaction conditions. 31 % of the reacted cyclooctene was oxidized into octane dial.

It will be appreciated that the instant specification and examples are set forth by way of illustration and not limitation, and that various modifications and changes may be made without departing from the spirit and scope of the present invention.

What is claimed is:

1. A process for the production of an alpha,omega-dialdehyde, comprising reacting a cyclic mono-olefin having about five 12 carbon atoms in the gaseous phase with about 0.005 to 200 times the molar amount of oxygen without a catalyst at a temperature of about 200° to 500°C and a pressure of about 0.05 to 100 atmospheres.

2. A process as claimed in claim 1 wherein the cyclic mono-olefin has about five to eight carbon atoms, about 0.02 to 50 moles of oxygen are used per mole of mono-olefin, the temperature is about 250° to 450°C and the pressure is about 1 to 15 atmospheres.

3. A process as claimed in claim 3, wherein about 0.05 to 5 moles of oxygen are used per mole of mono-olefin and the pressure is about 1 to 3 atmospheres.

4. A process as claimed in claim 1 wherein the cyclic mono-olefin is cyclopentene.

5. A process as claimed in claim 1 wherein the cyclic mono-olefin ic cyclohexene or cyclooctene.

6. A process as claimed in claim 1 wherein the oxygen is supplied in the form of air.

7. A process as claimed in claim 1 wherein the cyclic mono-olefin is supplied admixed with at least one hydrocarbon other than a cyclic mono-olefin.

8. A process as claimed in claim 1 wherein the cyclic mono-olefin and oxygen are reacted by passage through a tubular reactor wherein they reside for about 0.01 to 100 seconds.

9. A process as claimed in claim 4 wherein the oxygen is supplied in the form of air, the cyclic mono-olefin is supplied admixed with at least one hydrocarbon other than a cyclic mono-olefin, and the cyclic mono-olefin and oxygen are reacted by passage through a tubular reactor wherein they reside for about 0.01 to 100 seconds.

* * * * *

UNITED STATES PATENT AND TRADEMARK OFFICE
CERTIFICATE OF CORRECTION

PATENT NO. : 3,923,903
DATED : December 2, 1975
INVENTOR(S) : Laszlo Imre et al

It is certified that error appears in the above-identified patent and that said Letters Patent are hereby corrected as shown below:

Col. 1, line 29, cancel "3,565,804" and substitute --Methoden--,

Col. 5, line 65 (Table 3), under heading "(sec)" insert -- 3.7-- above "4.7".

Col. 6, line 56, between "5" and "2" insert -- . --.

Col. 9, claim 1, line 3, cancel "five" and substitute -- 5 to --.

Signed and Sealed this twentieth Day of April 1976

[SEAL]

Attest:

RUTH C. MASON
*Attesting Officer*

C. MARSHALL DANN
*Commissioner of Patents and Trademarks*